(12) United States Patent
Mooney

(10) Patent No.: US 7,107,935 B2
(45) Date of Patent: Sep. 19, 2006

(54) FLOOR COVERING FOR AN ANIMAL HOUSE

(76) Inventor: Patrick Roy Mooney, 20 Temple Square, Dartry, Dublin 6 (IE)

( * ) Notice: Subject to any disclaimer, the term of this patent is extended or adjusted under 35 U.S.C. 154(b) by 498 days.

(21) Appl. No.: 10/250,738

(22) PCT Filed: Jan. 4, 2002

(86) PCT No.: PCT/EP02/00274

§ 371 (c)(1), (2), (4) Date: Oct. 27, 2003

(87) PCT Pub. No.: WO02/065831

PCT Pub. Date: Aug. 29, 2002

(65) Prior Publication Data

US 2004/0093810 A1   May 20, 2004

(30) Foreign Application Priority Data

Jan. 4, 2001  (IE) ................................ 2001/0005
Jan. 4, 2001  (IE) ................................ S2001/0006

(51) Int. Cl.
*A01K 1/015*  (2006.01)
*A01K 1/01*   (2006.01)

(52) U.S. Cl. ..................... 119/529; 119/526
(58) Field of Classification Search ........ 119/525, 119/526, 528, 529
See application file for complete search history.

(56) References Cited

U.S. PATENT DOCUMENTS 3,699,926 A * 10/1972 Stockl .................... 119/526
5,724,916 A *  3/1998 Brodie et al. ........... 119/525
5,813,365 A *  9/1998 Helmy ................... 119/528
5,862,779 A *  1/1999 Kleinsasser ............. 119/529
6,053,126 A *  4/2000 Klinger .................. 119/526
6,079,366 A *  6/2000 Telleen .................. 119/525
6,889,631 B1 * 5/2005 McGregor ............... 119/528

* cited by examiner

*Primary Examiner*—Robert P. Swiatek
*Assistant Examiner*—Elizabeth Shaw
(74) *Attorney, Agent, or Firm*—John R. Flanagan

(57) ABSTRACT

Floor covering (I) for an animal house for beef animals and dairy animals comprises an elastomeric mat (2) which can be fixed to a floor or floor slat by screws (8). Rigid strips (6) are located at the base (7) of mat (2) for securing the screws (8) which are coverable by the mat when it is fixed to the slat. Mat (2) is designed for cleanliness and enhanced protection and comfort for animals. Flap valve (3) forms an openable flap valve along one longitudinal edge of the mat (2) to seal a gap between adjacent slats of a slatted floor to reduce the emission of gases and fumes emanating from a tank beneath the floor. The flap valve (3) allows waste material to pass through the slatted floor to the tank.

29 Claims, 14 Drawing Sheets

FLOOR COVERING FOR AN ANIMAL HOUSE

BACKGROUND OF THE INVENTION

The present invention relates to a floor covering for the protection and comfort of animals, such as beef animals and dairy animals, in an animal house and more particularly to improvements in and relating to mats for concrete floors or concrete slats of slatted houses, for standing areas in animal houses, around feed and water stations, and the bases of cubicle entrances.

It is known to place a mat comprising a rubber strip onto the concrete slats in slatted houses used for housing cattle. The known mat is secured on the concrete slat by either tying the mat on to the slat using a wrap around band or by directly screwing the mat into the concrete slat. Securing the mat using the band has not proved to be successful primarily because the band can become damaged. Furthermore the mat is not fully secured to the slat and the mat is likely to come loose and become slideable relative to the slat.

The disadvantage of screwing this type of mat into the concrete slat is that the exposed screws can pose a hazard either when an animal kneels directly onto the screws resulting in injury to the animal or if and when the screw rusts, again posing a danger to the animal. A more recent attempt of overcoming the problem involves the use of rubber strips attached by means of a bung or clip. For this system to function properly, the concrete flooring would need to be completely uniform which does not happen in practice.

The mixture of manure, urine and silage effluent that flows into a slurry tank beneath an animal house produces hazardous gases which continually disperse up through the gaps in the concrete slats and circulate around the slatted house. These gases are detrimental to the welfare of the animals that are housed under these conditions and to the farm workers who take care of the animals on a daily basis.

None of these prior art systems address the comfort and protection of the animal or assist in dealing with hazardous gases. In order to improve the protection and comfort of animals on concrete and concrete slatted floors while maintaining the proven features of such floors, a floor covering which provides a more beneficial animal floor surface was proposed by the inventor of the present invention in Irish Short-Term Patent Application No. S990443 and International Patent Application No. PCT/IE99/00098. The floor covering disclosed in these applications comprises elongated strips of elastomeric material engageable in separate housings fitted to each separate slat.

However, a number of problems subsist in the technical solutions in Irish Short-Term Patent Application No. S990443 and International Patent Application No. PCT/IE99/00098. The elongated strips of elastomeric material are difficult to secure to the housings and their installation is labour intensive.

SUMMARY OF THE INVENTION

The present invention seeks to alleviate the disadvantages associated with the prior art and the problems associated primarily with slatted floors and also concrete floors.

Accordingly, there is provided a floor covering for an animal house adapted to provide comfort and protection for beef and dairy animals comprising an elongate elastomeric mat adapted to be fixed to a concrete floor or a concrete floor slat by fixing means, the mat having an integral rigid portion for receiving the fixing means which are coverable by the mat when it is fixed to the slat, without detracting from the protection and comfort given to the animals.

Advantageously, the mat has an openable elongate flap valve extending from at least one longitudinal edge of the mat for sealing a gap between adjacent slats of a slatted floor.

A floor covering of this type with a flap valve can reduce harmful gas and odour emissions which are continuously circulating around a house holding animals which are housed in holdings of this type. Any reduction in gas emission is of benefit to farm workers who spend a considerable amount of time in the slatted house taking care of the housed animals, or who are in the animal house during mixing and emptying the slurry tank at various times of the year. Additionally, the unitary nature of the mat reduces the complexity of assembly of the floor covering thereby reducing the installation time for farmers. A one-piece mat also removes the possibility of relative movement between a housing member and a housed strip preventing injury to the housed animals as a result of them loosing their footing.

Preferably, the mat is formed using a multi-extrusion process. Using this technique, components of the mat can be formed separately inside the tool and then co-extruded together in a final step of the overall process.

Optionally, the components are formed from different materials or from the same materials having different densities. This allows the manufacturer to alter the physical properties of the product depending on customer requirements.

Ideally, the width of the entire extrusion may be varied by varying the speed of extraction of the materials forming the component parts of the floor covering.

In a particularly preferred embodiment, the mats are extruded having a plurality of longitudinally extending cavities to maximise comfort. This allows the product to have an increased protection and comfort whilst increasing the shock absorbent properties of the mat with the inclusion of the central cavity.

In one embodiment, the main body comprises a high content of nitrile rubber or a similar material with a high compression set which gives good shock absorbency in the finished mat.

In a particularly preferred embodiment, a hard-wearing durable material is used to provide the outer surface of the main body of the mat. This provides a further layer of protection for the product against the substantial impact forces imparted by the housed animals.

Preferably, the rigid portion is provided by a number of longitudinal rigid strips which are co-extruded with the mat in a final step of the overall manufacturing process.

Ideally, the rigid strips are co-extruded during manufacture onto the base of the mat and are uniformly distributed about the base to evenly dissipate the load applied about each connection between the mat and the slat or concrete floor. This prevents an uneven distribution of load about any individual connection preventing excessive wear and tear about that particular connection.

Advantageously, the mat is manufactured from a non absorbent material and has a domed profile in order not to react with or retain animal urine and dung, thereby assisting in improving the cleanliness of the housed animals.

Preferably, the rigid strips act as washers for the fixing means increasing the strength of the connection between the mat and the slat or concrete floor. The elastomeric mat is subjected to considerable stress and strain due to the uneven weight distribution of animals moving about on the mats.

Providing rigid strips along the entire length of the mats prevents the elastomeric mat from easily tearing away from the fixing means and slat.

In a particularly preferred embodiment, the location of the rigid strips on the base of the mat is indicated on the top surface of the mat. This provides a means for identifying the location of the strips to assist in fixing the mats to the slats.

Ideally, the barrier is provided by a flap extending from one longitudinal edge of the mat. It will of course be appreciated that the flap could extend from either longitudinal edge or both longitudinal edges of the mat.

Preferably, a groove extends longitudinally intermediate the flap and the mat providing a hinge for the flap.

In one embodiment, the flap extends under the bottom surface of the adjacent slat forming a seal.

Ideally, the fixing means is provided by self-tapping screws, masonry nails or any other fixing means which may be applied through the elastomeric mat, lodged in the rigid strips, secured into the concrete slat or concrete floor and are covered over by the elastomeric mat so that animals cannot come in contact with the fixing means.

In a particularly preferred embodiment, the rigid strips are vertically aligned with a number of central cavities allowing the fixing means to pass through the outer skin into the central cavities and to lodge into rigid strips. The heads of the fixing means will not remain proud in the cavity when the fixing means are fully installed.

In one embodiment, a number of longitudinal grooves are provided on the base of the mat. These grooves increase the flexibility and shock absorbent capabilities of the mat. The grooves provide that a solid piece of material will not extend from the top to the bottom of the mat. This reduces the overall impact forces transmitted to the housed animals when compared with a completely solid mat.

Installation of the mats requires a user to fix the mats to the slats with their flap valves extending in the same direction. Ideally only one flap valve is required on each mat when this technique of installation is used.

Alternatively, the mats may be fitted in either direction when a flap valve extends from both longitudinal edges of the mat.

Ideally, the mats are formed using different materials. The mats may be formed from a rigid material or a soft material depending on their particular function.

Ideally, the mats are manufactured from any extrudable rubber or synthetic material.

The present invention also provides a mat for use on concrete slats in slatted houses comprising a flange provided along two opposing edges of the mat, through which flange a fixing means can be inserted so as to secure the mat onto the concrete slat and further comprising a flap provided along said two opposing edges of the mat, the flap being movable between an open position and a closed position whereby in the open position, the flap is lifted up and the flange is exposed so that the fixing means can be inserted into the flange and in the closed position, the flap is lying down over the flange thereby covering over the fixing means inserted through the flange.

Ideally, the mats are formed using different materials. The mats may be formed from a rigid material or a soft material depending on their particular function. In a preferred embodiment, the mats are extruded having a central core and a covering skin, This allows the manufacturer to use an inexpensive material for the core and then cover the core with a rigid skin.

Advantageously, in one embodiment of the mat, a shock absorbent material may be located underneath the mat and is securable thereto.

In an alternative embodiment of the mat a plurality of ridges may be provided on the underneath of the mat to provide a cushioning effect.

BRIEF DESCRIPTION OF THE DRAWINGS

The invention will now be described with reference to the accompanying drawings, which show, by way of example only, a number of embodiments of a slatted house floor covering in accordance with the invention in which.

DETAILED DESCRIPTION OF THE INVENTION

Figure 1:
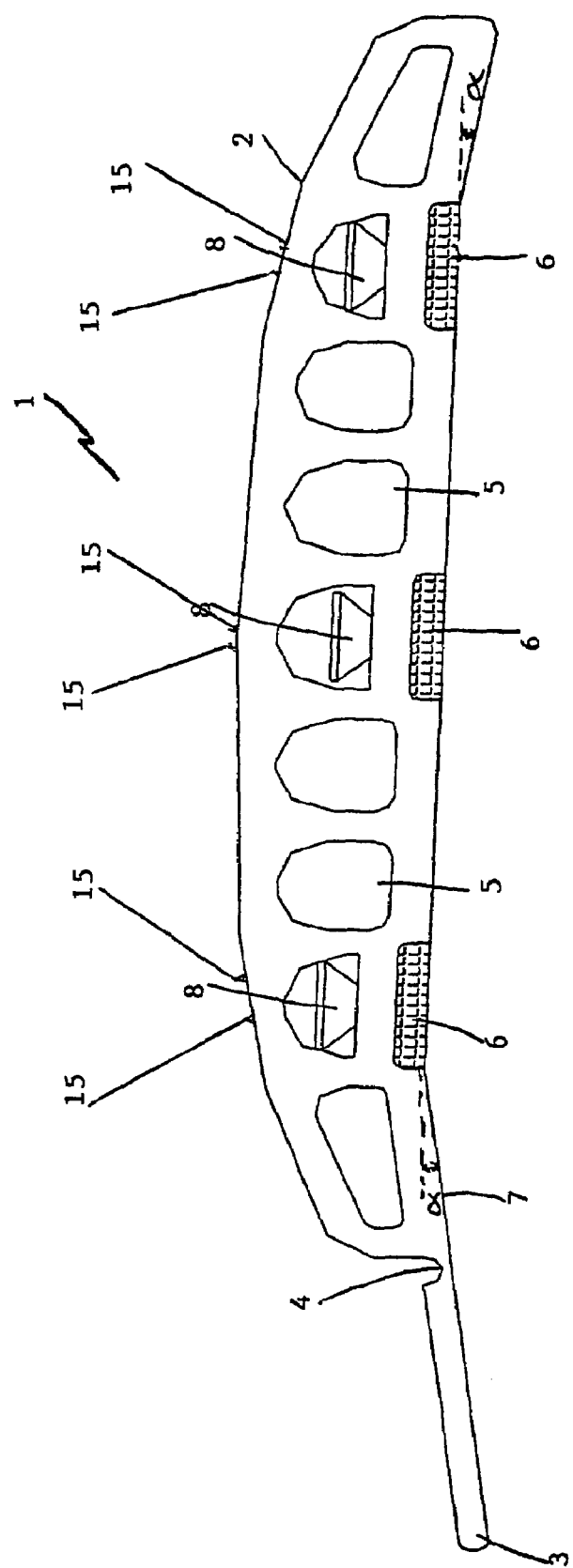
FIG. 1 is a cross sectional view of a first embodiment of a floor covering having a domed surface for cleanliness and with the securing screws shown proud and before final installation.

Referring to the drawings and initially to FIG. 1 there is shown a floor covering indicated generally by the reference numeral 1. The floor covering 1 is provided by a domed mat 2 having a flap valve 3. A groove 4 is located between the flap valve 3 and the mat 2 to provide a hinge. The mat 2 has a number of central cavities 5 extending longitudinally through the mat 2. Three rigid strips 6 which act as anchors for screws 8 are located about the base 7 of the mat 2. Three screws 8 e.g. self-tapping screws are screwed through the mat 2, the central cavities 5 and the rigid strips 6 providing a secure connection between the mat 2 and the slat (not shown). When completely screwed in the heads of the screws 8 are buried into the strips 6 which also retain the shape of the mat.

A pair of parallel lines 15 are located on the upper surface of the mat to indicate the location of the strips 6 on the bottom surface. The screws 8 are inserted between the indicating lines 15 and the material closes back over again after the screws have been inserted.

As shown in FIG. 1, the edges of the mat are inclined at an angle a from the bottom surface of the mat. This creates a improved seal with the floor and ensures that the edges of the mat grip the floor and are not inclined to turn upwards. The surface of the mat 2 is domed so that it does not retain animal urine and dung on its surface which will wash off easily. Also the mat is made of a non-absorbent material which will not react with the urine and dung.

Figure 2:
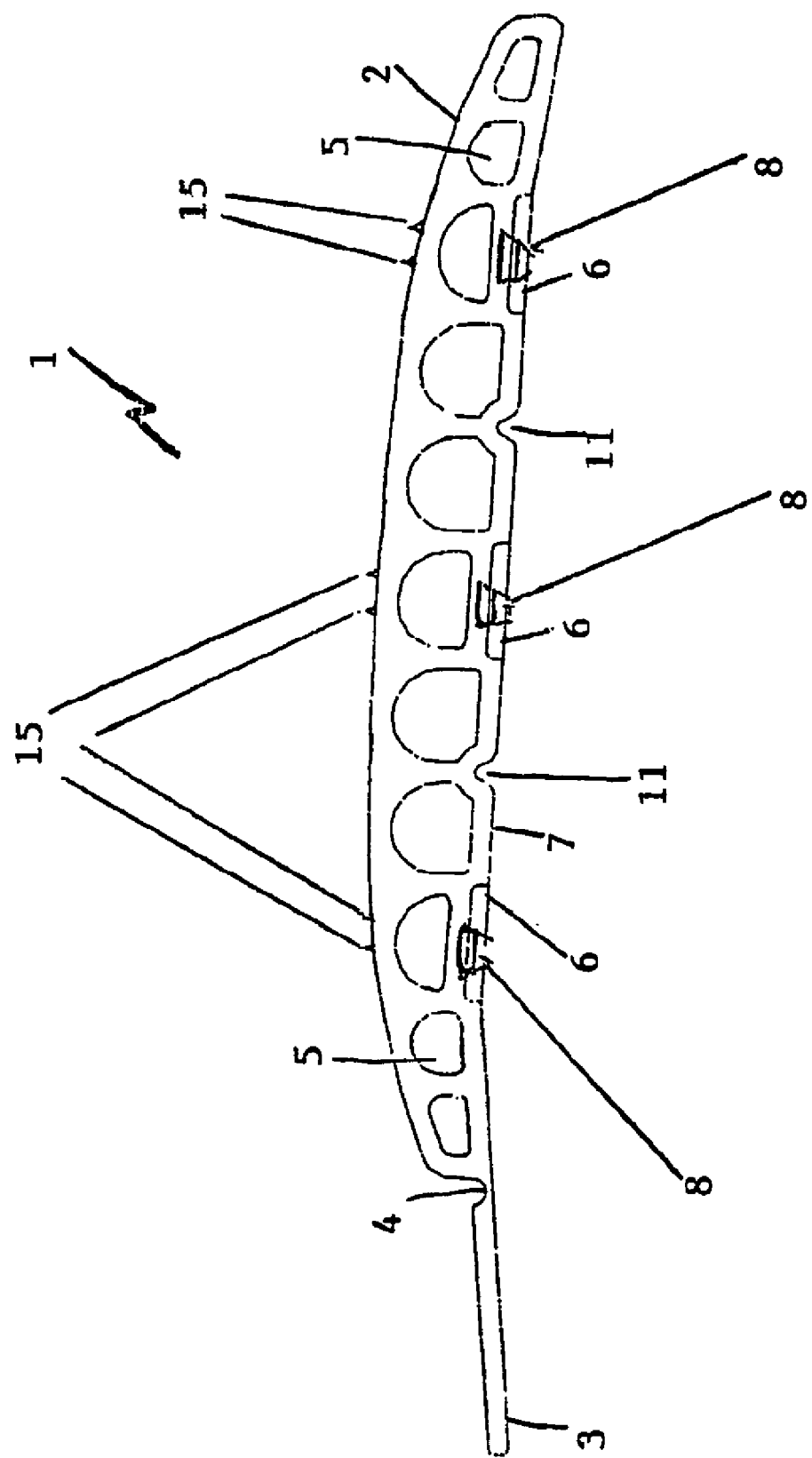
FIG. 2 is a cross sectional view of a second embodiment of floor covering showing the screws lodged in position in the rigid strips.

Referring to the drawings and now to FIG. 2, the features of the second embodiment which correspond with and are identical to features of the first embodiment are referenced by identical numerals. The floor covering indicated generally by the reference numeral 1 also includes a number of longitudinally extending grooves 11 located on the base 7. The grooves 11 prevent direct contact between the mat 2 and the concrete slat reducing forces transmitted to the housed animals. Two extra central cavities 5 are also included in the mat 2. Screws 8 are shown fully lodged into the strips 6.

In use, an operator locates each mat 2 about the top surface of a slat and pushes the flap valve 3 into the gap between the supporting slat and the adjacent slat. The flap valve 3 rests against the bottom surface of the adjacent slat or against the sidewall of the adjacent slat sealing the gap therebetween. Ideally, for slatted floors each mat 2 should be mounted with the flap valve 3 facing in the same direction. The operator can now fix the mat 2 to the slat by driving screws or nails 8 into the mat 2 and through the central cavities 5, rigid strips 6 and finally into the concrete slats. The self-tapping screws 8 are forced into the mat 2 until the screw heads are located within the rigid strips 6. This reduces the risk of an animal hurting itself on an exposed screw or nail head. The flap valve 3 flexes under the weight of waste material to allow the waste material to pass through the gap and then returns to a normally closed position to seal the gap. This reduces gas and odour emissions from a slurry tank below the ground ascending through the gaps between adjacent slats and into a house above the slatted floor. Slits can be provided along the length of the flap valve 3 at specified intervals so that only a portion of the elongate valve will open as required. If not required the flap valve 3 can be trimmed off or turned under the mat.

Figure 3:
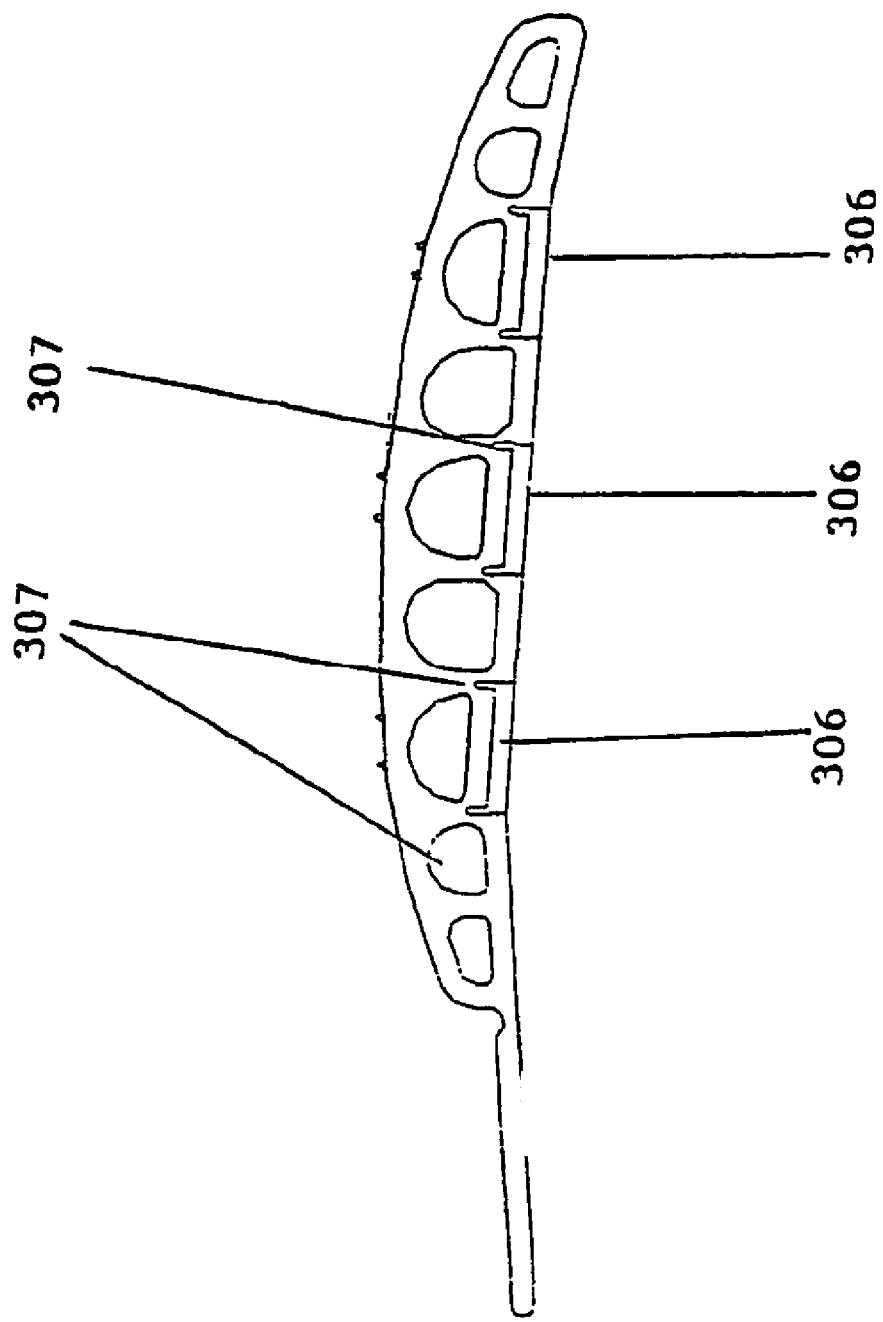
FIG. 3 is a cross sectional view of a third embodiment of floor covering.

The third embodiment 300 shown in FIG. 3 is similar to the first and second embodiments and like features are given like numerals. The mat 2 has a flap valve 4, a number of central activities 5 and three rigid strips 306 for securing the mat in position. Each strip 306 has a pair of lugs 307 to provide a secure anchoring with the main body of the mat 2.

The mats may also be joined in contiguous fashion where edges of each adjoining mat contact one another. The flap valves 3 may be inserted under each neighbouring mat or may be removed if desired. This arrangement is particularly beneficial where animals stand adjacent to feed and water stations. It may also be used to provide a comfort zone for animals standing on bare concrete floor or bare concrete slats.

Figure 4:
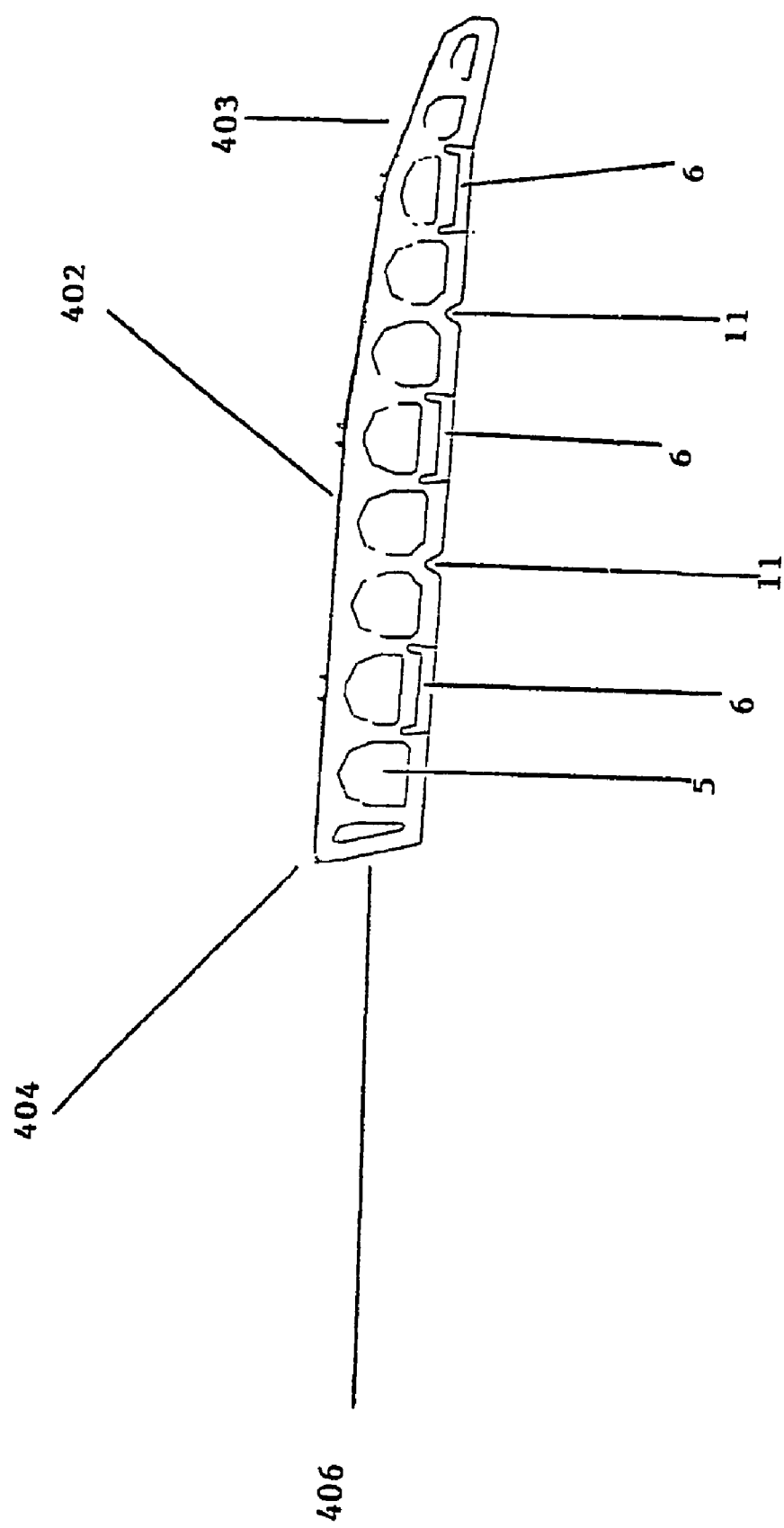
FIG. 4 is a cross sectional view of a fourth embodiment of floor covering which is designed for use on concrete floors and has particular application for dairy cows.

The fourth embodiment 400 shown in FIG. 4 which is particularly useful for dairy cows comprises a mat 402 which has a sloped section 403 at one side and a generally straight section 404 at the other side. The straight section 404 has a slightly tapered side wall 406 which ensures a good fit against a concrete strip or ledge as used in an animal cubicle shed and which are generally irregular in shape. The fourth embodiment 400 also includes central cavities 5, three rigid strips 6 and longitudinally extending grooves 11 located on the base 7. The embodiment 400 can be used in animal houses or portions of animal houses not having a slatted floor surface such as passageways between rows of cubicles and feeding areas in animal houses. The embodiment 400 provides a particularly beneficial shock absorbing mat for bovine cows when reversing out and down from a cubicle when the mat 402 is installed as a cubicle kerb. Observations from field tests have shown that the load taken by the hind claws of cows when reversing or slipping out from cubicles to be a very significant cause of lameness. The mat 402 provides a cushioned gripping surface for the cows' claws and the shape of the mat allows the claws to open and close correctly and naturally, thereby helping to prevent lameness. To protect a damaged claw a cow can stand so that only one half of a claw stands on the mat 402 with the other half of the claw suspended so as to take pressure off the damaged claw.

Figure 5:
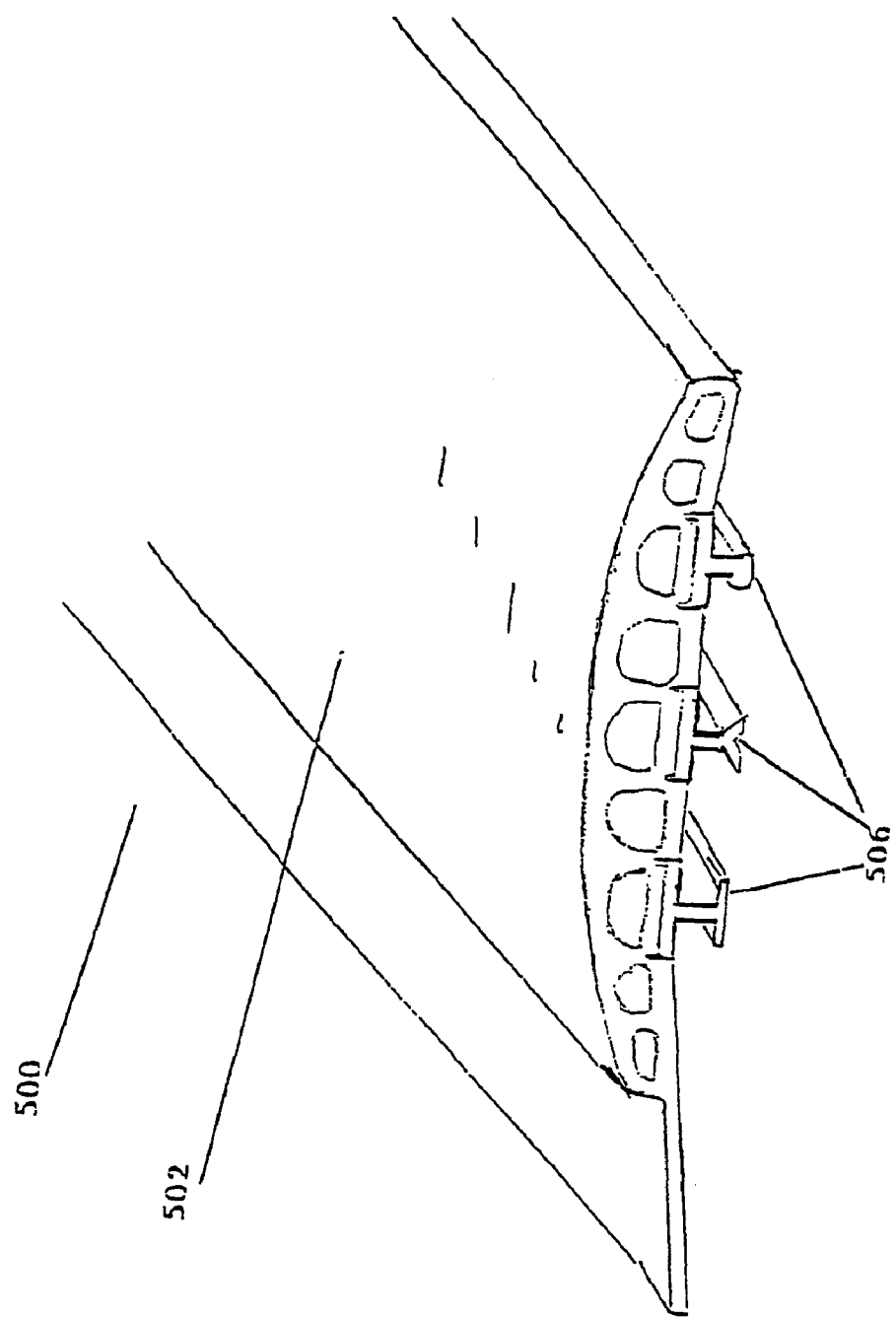
FIG. 5 is a cross sectional view of a fifth embodiment of floor covering.
Figure 6:
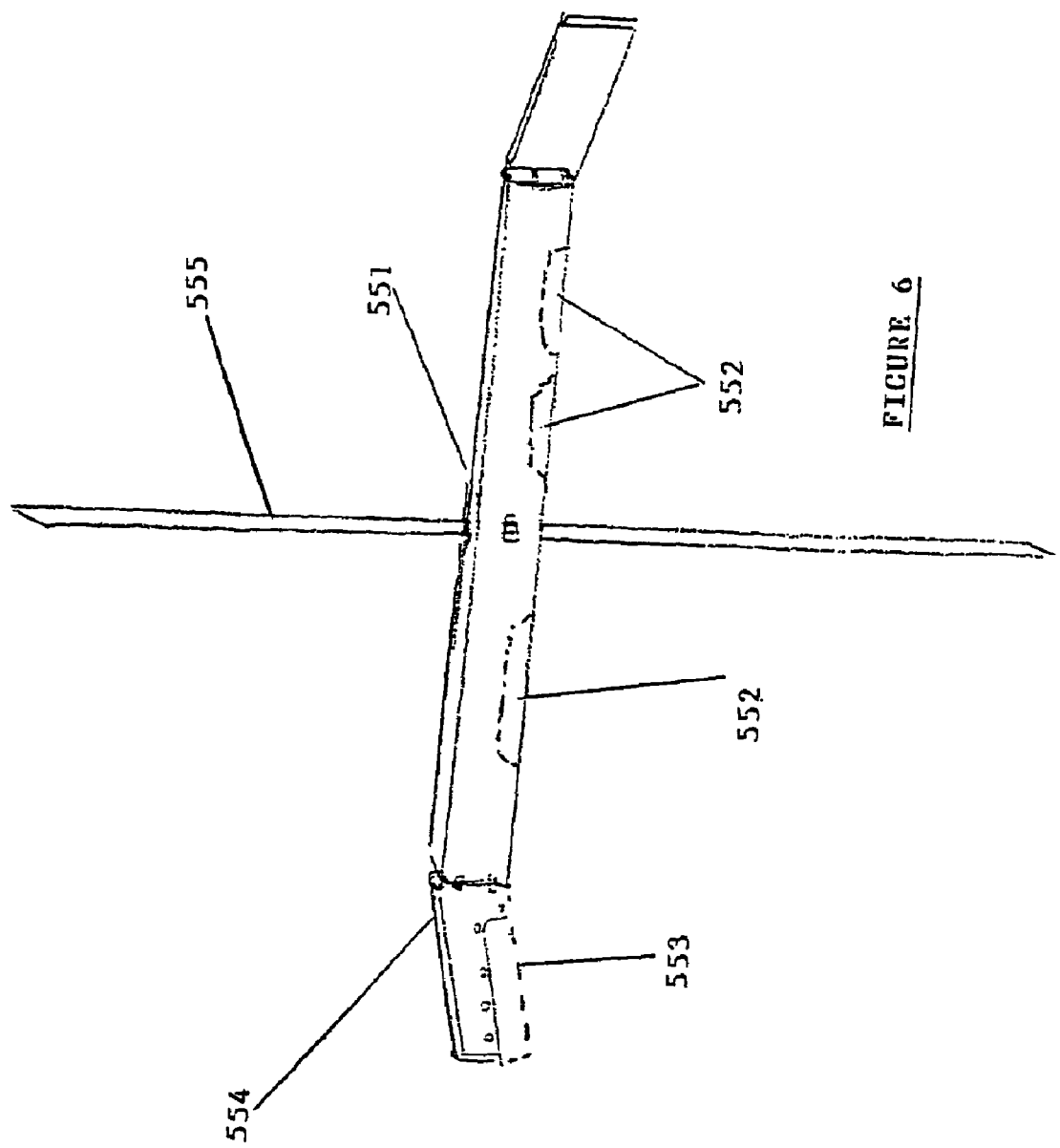
FIG. 6 is a side elevation view of a manure scraper modified to accommodate the floor covering of the invention
Figure 7:
FIG. 7 is a side view of a sixth embodiment of mat of the invention.
Figure 8:
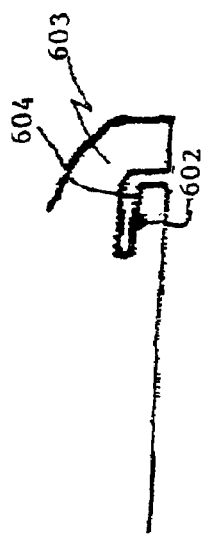
FIG. 8 is an enlarged side view of one of the edges of the mat showing the flange and flap of FIG. 7

In the fifth embodiment 500 shown in FIG. 5, which is similar to the first, second and third embodiments, the securing strips of the first three embodiments are replaced by three elongate anchoring formations 506 which secure the mat 502 to a concrete floor slat while the slat is being formed from wet concrete. The anchoring formations 506 are T-bars extending from the rigid strips and can have different shapes. Using the embodiment, the concrete floor slats are supplied with the mats already installed.

When mats according to the invention such as the embodiment 400 are secured in the passageways of cubicle houses which have scraper systems installed for the management of manure, it is necessary to modify the scraper for 551 to accommodate the mats located lengthwise along the passageway by providing cut outs 552 in the bar. A cut-out 553 is also provided in the wing 554 to accommodate a mat located to one side of the passage way. Pulling mechanism 555 draws the scraper 551 along a passageway.

Referring to FIGS. 7 to 12, the sixth embodiment of the mat of the invention is indicated generally by reference number 601. The mat 601 comprises a flange 602 and a flap 603 which are provided along the length of both major edges of the mat 601. The flap 603 and flange 602 are formed by a slot 604 made in the mat 601.

Figure 9:
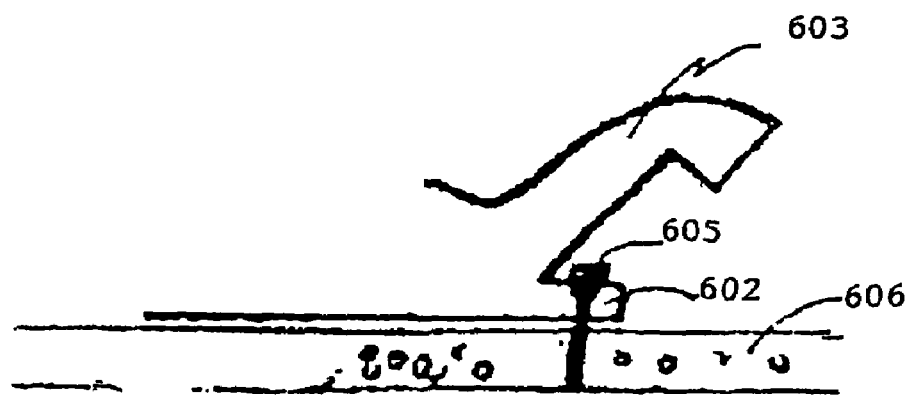
FIG. 9 is an enlarged side view of one of the edges of the mat showing the flap in the open position and showing a screw inserted through the flange.
Figure 10:
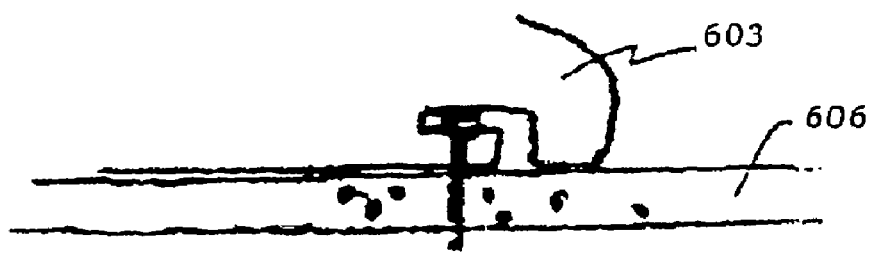
FIG. 10 is an enlarged side view of one of the edges of the mat showing the flap in the closed position in which it covers over the flange and the screw inserted therethrough.

In use, the mat 601 is placed on a concrete slat 606, the flap 603 is lifted up into the open position as shown in FIG. 9 and a number of screws 605 are inserted through the flange 602 along the length of the mat 601 at both major edges, thereby securing the mat to the concrete slat 606. The flap 603 is then lowered to the closed position as shown in FIG. 10 and the screw is covered thus protecting animals from injury and preventing the screw from rusting.

Figure 11:
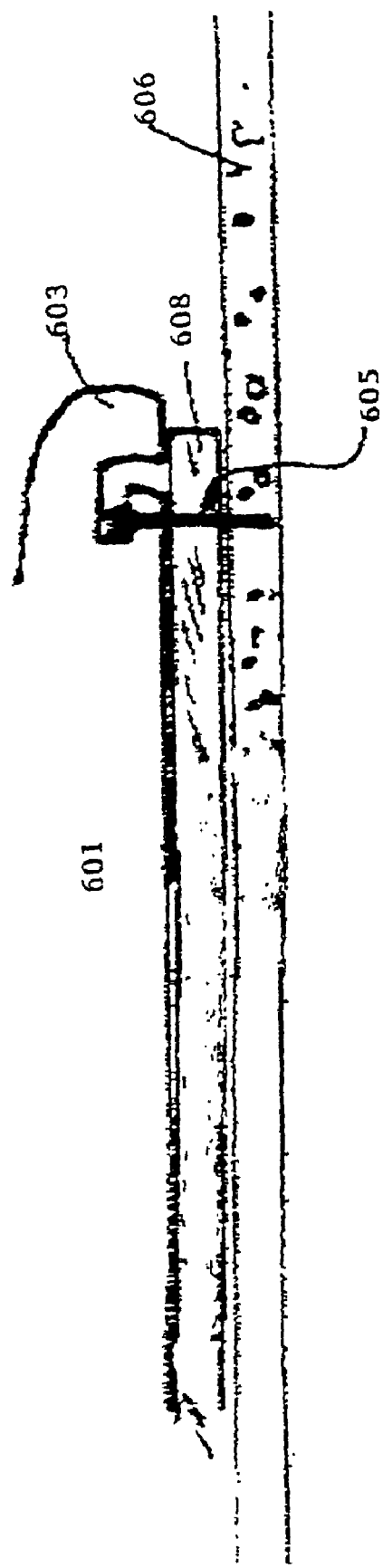
FIG. 11 is a side view of the mat in use with a sheet of shock absorbent material located under the mat and secured to the mat and to the concrete slat.
Figure 12:
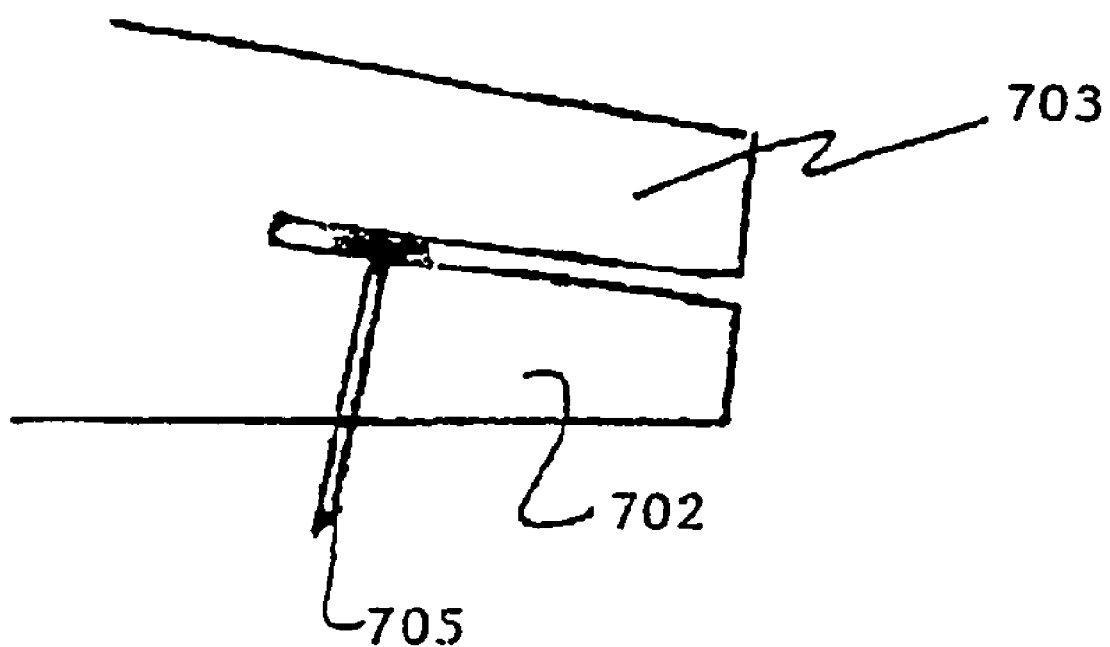
FIG. 12 is an enlarged side view of the mat of the sixth embodiment showing a screw inserted at an angle into the flange.

A shock absorbent material 608 may be placed underneath the mat 601 as shown in FIG. 11. The shock absorbent material 608 offers protection to the mat 601 and the shock absorbent material 608 is secured by the mat 601 lying thereon and by the screw 605.

It will be appreciated that the shock absorbent material 608 may be inserted as a separate sheet under the mat 601 or may be attached to the mat 601.

Figure 13:
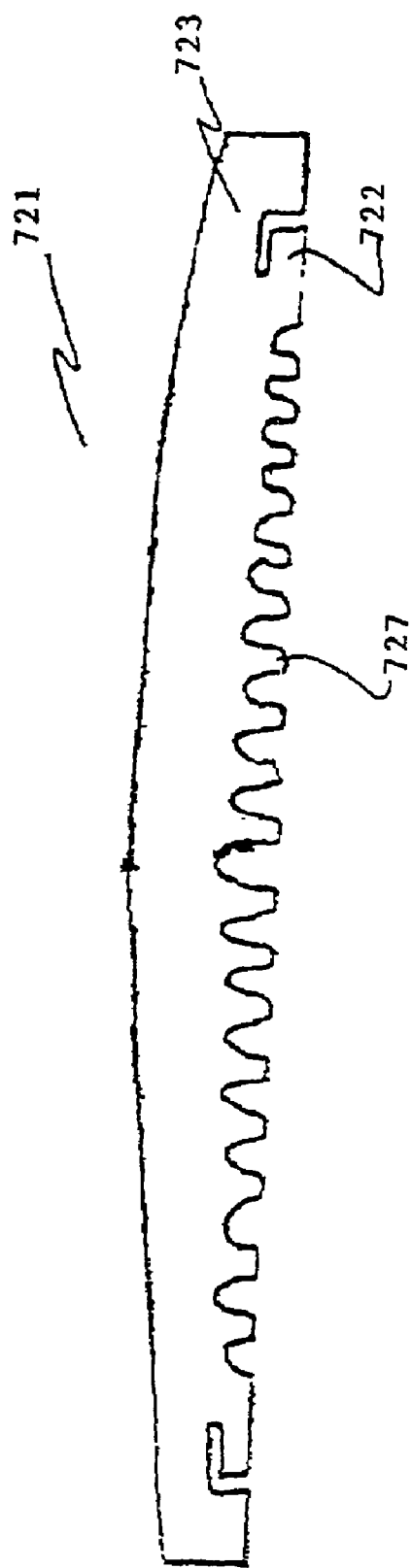
FIG. 13 is a side view of a seventh embodiment of the mat in which a plurality of ridges are provided on the underneath of the mat.
Figure 14:
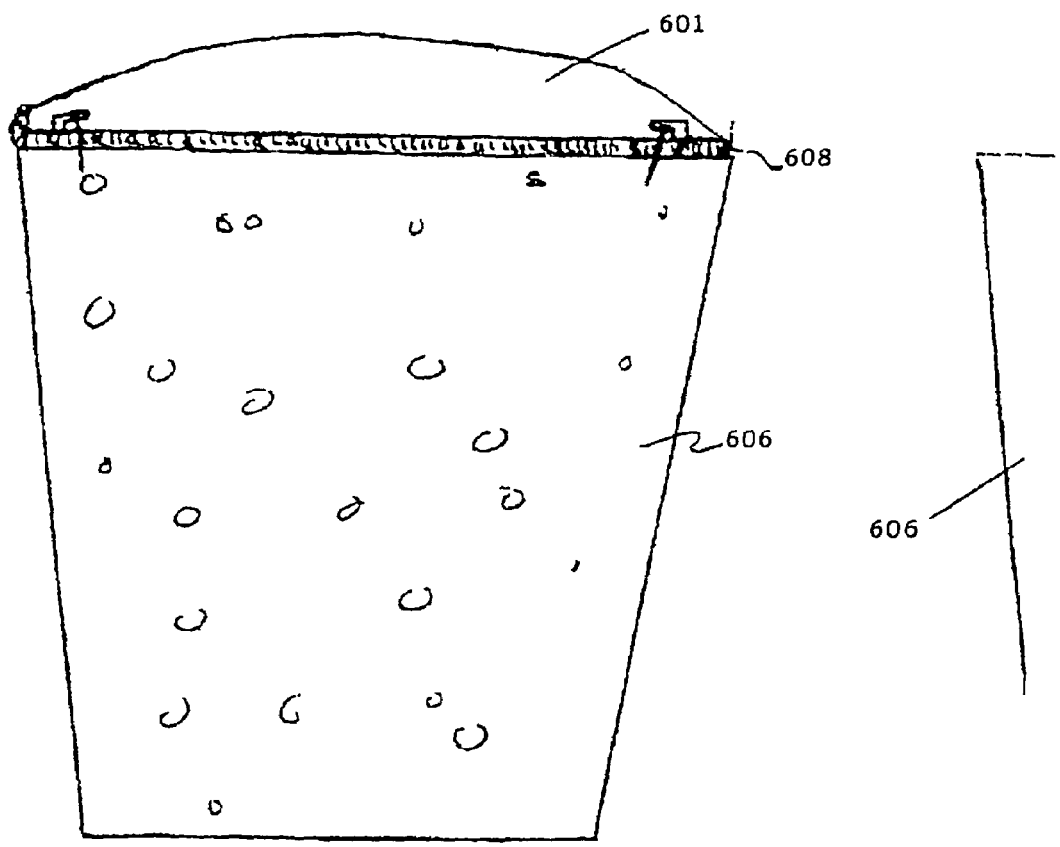
FIG. 14 is a side view of the mat and shock absorbent material located on an individual concrete slat.

A seventh embodiment of the mat is shown in FIG. 13. The mat of the seventh embodiment is indicated generally by reference numeral 721. The mat 721 includes a flap 723 and a flange 722 which have the same form and function as described above in relation to the sixth embodiment. The mat 721 is provided with a plurality of ridges 727 on the underside of the mat 721. The ridges 727 provide a cushioning effect for the mat 721 and provide an alternative to the inclusion of the shock absorbent material 608 referred to above.

Figure 15:
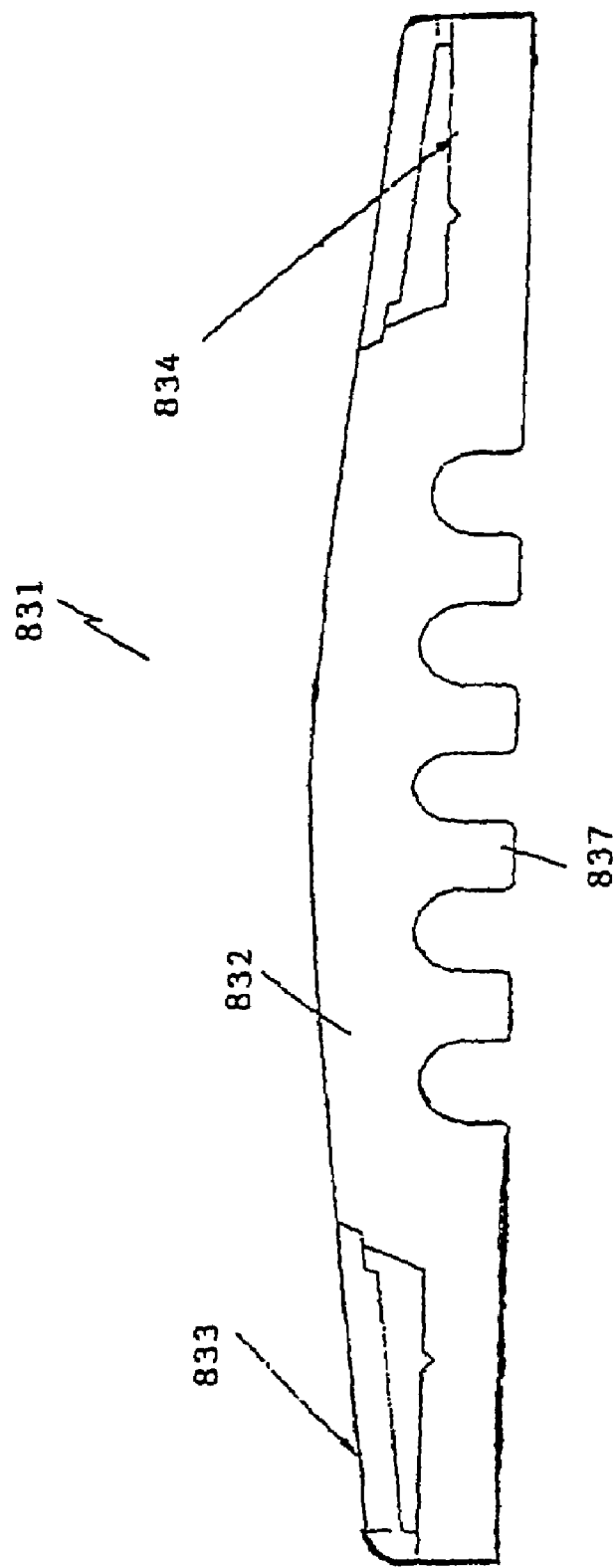
FIG. 15 is a side view of an eighth embodiment of the mat in accordance with the invention.
Figure 16:
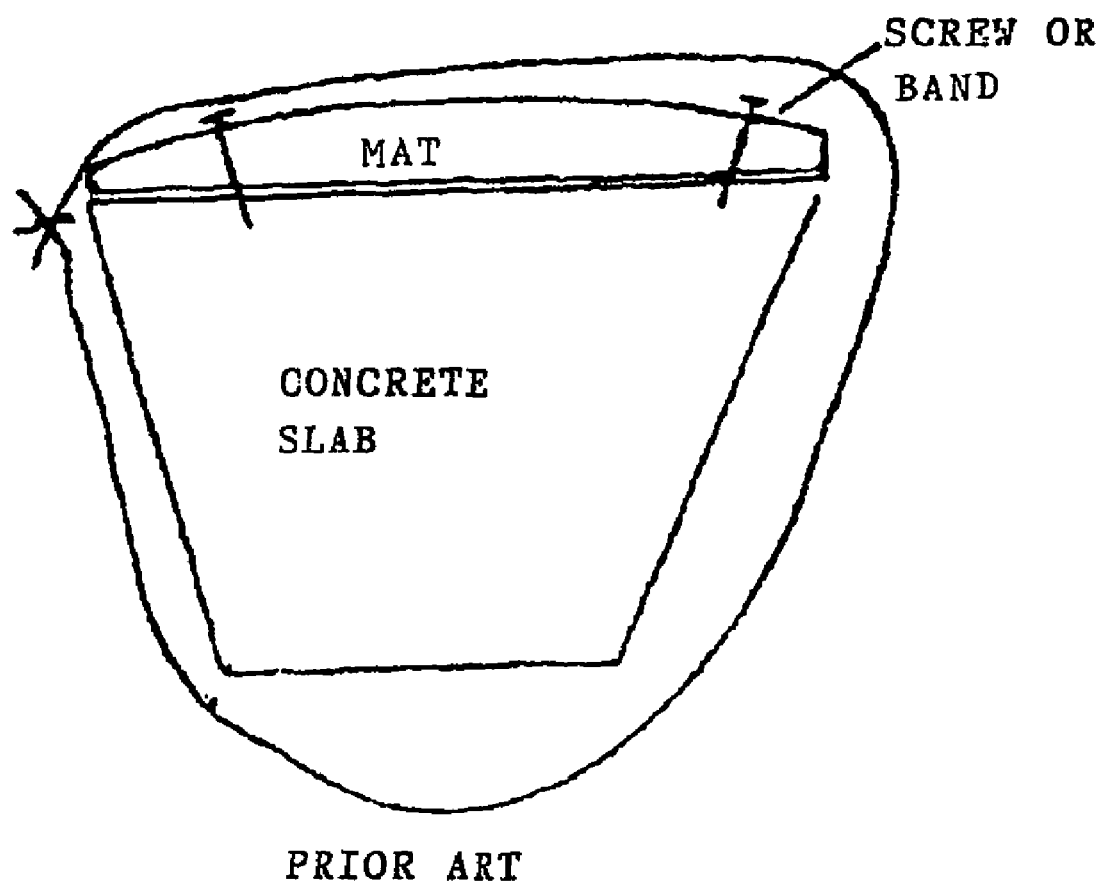
FIG. 16 is a schematic diagram of the prior art mat located on an individual concrete slat and showing a screw and a band, used in the prior art.

Referring finally to FIG. 15, there is shown an eighth embodiment of the mat 831 formed using a multi-extrusion process. The main body 832 of the mat 831 is extruded in one piece and the flaps 833 are both extruded separately. In a final step of the multi-extrusion process the flaps 833 are co-extruded with the main body 832 of the mat 831 completely covering the flanges 834. The mat 831 is provided with a plurality of ridges 837 on the underside of the mat 831. The ridges 837 provide a cushioning effect for the mat 831.

It will of course be understood that the invention is not limited to the specific details as herein described, which are given by way of example only, and that various alterations and modifications may be made without departing from the scope of the invention as defined in the appended claims.

What is claimed is:

1. A floor covering for an animal house adapted to provide comfort and protection for beef and dairy animals, comprising:
   an elongate elastomeric mat; and
   means for fixing the mat to a concrete floor or a concrete floor slat;
   the mat having an integral rigid portion for receiving the fixing means such that the fixing means are coverable by the mat when the mat is fixed to the slat, without detracting from the protection and comfort given to the animals.

2. A floor covering for an animal house as claimed in claim 1, in which the mat has an openable elongate flap valve extending from at least one longitudinal edge of the mat for sealing a gap between adjacent slats of a slatted floor.

3. A floor covering as claimed in claim 2, wherein the flap valve is provided by a flap extending from one longitudinal edge of the mat.

4. A floor covering as claimed in claim 3, wherein the flap extends under a bottom surface of an adjacent slat forming a seal.

5. A floor covering as claimed in claim 3, wherein the flap extends down and across the gap abutting against a sidewall of the adjacent slat forming a seal.

6. A floor covering as claimed in claim 3, wherein a groove extends longitudinally intermediate the flap and the mat to provide a hinge for the flap valve.

7. A floor covering as claimed in claim 1, wherein the mat is formed using a multi-extrusion process.

8. A floor covering as claimed in claim 7, wherein the width of the entire extrusion is variable by varying the speed of extraction of the materials forming the component parts of the floor covering.

9. A floor covering as claimed in claim 7, wherein the mat is extruded having a covering main body and a fixing means and the main body has a plurality of longitudinally extending central cavities.

10. A floor covering as claimed in claim 9, wherein the main body comprises a high content of nitrile rubber or a similar material with a high compression set which gives good shock absorbency in the finished mat.

11. A floor covering as claimed in claim 3, wherein the rigid portion is provided by a number of longitudinal rigid strips which are co-extruded with the mat.

12. A floor covering as claimed in claim 11, wherein the rigid strips act as washers for the fixing means and also act as supports to retain the shape of the mat.

13. A floor covering as claimed in claim 11, wherein the rigid strips are co-extruded onto a base of the mat and are uniformly distributed about the base to evenly dissipate the load applied about each connection between the mat and the slat.

14. A floor covering as claimed in claim 11, wherein the mat has a number of central cavities and the rigid strips are vertically aligned with the central cavities to maximize comfort of the animals and to allow access for the fixing means.

15. A floor covering as claimed in claim 11, wherein the location of the rigid strips on the base of the mat is indicated on the top surface of the mat to provide a guide for the fixing means.

16. A floor covering as claimed in claim 1, wherein the rigid portion is provided by a number of longitudinal rigid strips and the fixing means is provided by fasteners which may be applied through the elastomeric mat, embedded in the rigid strips and secured into the concrete slat.

17. A floor covering as claimed in claim 1, wherein a number of longitudinal grooves are provided on the base of the mat.

18. A floor covering as claimed in claim 1, wherein the mat is formed using materials of variable rigidity.

19. A floor covering as claimed in claim 1, wherein the mat is manufactured from any extrudable rubber or synthetic material.

20. A floor covering as claimed in claim 1, wherein the mat is manufactured from a non-absorbent material in order not to react with, and has a domed profile in order not to retain, animal urine and dung thereby assisting in improving the cleanliness of the housed animals.

21. A floor covering as claimed in claim 1 in which the edges inclined at an angle from a bottom surface of the mat, thereby creating an improved seal with the floor or slat and ensuring that the edges of the mat grip the floor and are not inclined to turn upwardly.

22. A floor covering as claimed in claim 1 in which the mat is provided with a tapered side wall to ensure a good fit against an irregularly shaped concrete structure such as a base of an animal cubicle wall.

23. A floor covering as claimed in claim 1 in which the mat includes a surface adapted to support an animal's claw and allow it to function naturally.

24. A floor covering as claimed in claim 1 in which a surface of the mat is sloped to one side to prevent urine and dung from being retained on the mat.

25. A mat for use on concrete slats in slatted houses, comprising:
   a main body having two opposing edges;
   a flange provided along the two opposing edges of the main body of the mat;
   a fixing means insertable through the flange so as to secure the main body of the mat onto the concrete slat; and
   a flap provided along said two opposing edges of the main body of the mat, the flap being moveable between an open position and a closed position whereby in the open position the flap is lifted up and the flange is exposed so that the fixing means can be inserted into the flange and in the closed position the flap is lying down over the flange thereby covering over the fixing means inserted through the flange.

26. A mat for use on concrete slats as claimed in claim 25, in which the mat is formed using different materials, the mat being formed from a rigid material or a soft material depending on its particular function.

27. A mat for use on concrete slats as claimed in claim 25 in which the mat is extruded having a central core and a covering skin, thereby allowing a manufacturer to use an inexpensive material for the core and then cover the core with a rigid skin.

28. A mat for use on concrete slats as claimed in claim 25, in which a shock absorbent material is located underneath the main body of the mat and is securable thereto.

29. A mat for use on concrete slats as claimed in claim 25, in which a plurality of ridges are provided on an underneath of the main body of the mat to provide a cushioning effect.

* * * * *

UNITED STATES PATENT AND TRADEMARK OFFICE
CERTIFICATE OF CORRECTION

| | |
|---|---|
| PATENT NO. | : 7,107,935 B2 |
| APPLICATION NO. | : 10/250738 |
| DATED | : September 19, 2006 |
| INVENTOR(S) | : Patrick Roy Mooney |

Page 1 of 1

It is certified that error appears in the above-identified patent and that said Letters Patent is hereby corrected as shown below:

Column 7, line 35, after "by" insert -- a flap portion of --.

Column 8, line 1, delete "3" and insert therefor -- 7 --.

Column 8, line 28, delete "the" and insert therefor -- a --.

Signed and Sealed this

Twenty-third Day of January, 2007

JON W. DUDAS
*Director of the United States Patent and Trademark Office*